UNITED STATES PATENT OFFICE.

FRITZ ACH, OF MANNHEIM, GERMANY, ASSIGNOR TO C. F. BOEHRINGER & SOEHNE, OF MANNHEIM-WALDHOF, GERMANY.

AMIDO-TARTRONIC ACID AND PROCESS OF MAKING SAME.

SPECIFICATION forming part of Letters Patent No. 676,859, dated June 25, 1901.

Application filed September 25, 1899. Serial No. 731,674. (Specimens.)

*To all whom it may concern:*

Be it known that I, FRITZ ACH, a citizen of the Empire of Germany, residing at Mannheim, in the Empire of Germany, have invented new and useful Improvements in Amido-Tartronic Acids and Processes of Making the Same, of which the following is a specification.

This invention relates to the manufacture of tartronic-acid derivaties; and the object of the same is the production of amido-phenyltartronic acid and substitution products of the same, all of which have hitherto been unknown. I have found a method whereby one is enabled to prepare paraamido-phenyltartronic acid $(NH_2.C_6H_4.C(OH):(CO_2H)_2$ and a series of substitution products of the same. For this purpose I employ as starting material the condensation products of alloxan with aromatic bases, which were first prepared and described by Pelizzari in *Gazetta Chimica Italiana*, Vol. 17, page 412, *et seq.* Pelizzari, moreover, endeavored to obtain products of disintegration from anil-alloxan and dimethyl-anil-alloxan by the action of alkali and observed in the course of his investigations that these bodies readily give off ammonia and carbonic acid under the influence of dilute alkalies in the cold, being thereby converted into acids which are distinguished from the starting materials by the decreased percentage of NH—CO. To mention an example, he obtained from anilalloxan $(C_{10}H_9N_3O_4)$ an acid having the formula $C_9H_8N_2O_3$ when acting on the same with a ten-per-cent. potash lye (KHO) in the cold, the process being indicated in the equation:

$$C_{10}H_9N_3O_4+H_2O=C_9H_8N_2O_3+CO_2+NH_3$$

or

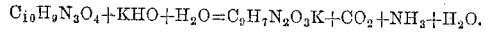

Pelizzari made the further discovery that these acids on further treatment with alkali or barium hydrate and heat will give off ammonia and carbon dioxid. He was, however, unable to obtain any tangible or definite products under this treatment. I have found that well-defined products may be readily obtained if alkalies are caused to act on the addition products of alloxan and aromatic bases while heating the same. As a result of this reaction carbon dioxid and ammonia are split off, on the one hand, by reason of the complete saponification of the urea residue derived from the alloxan molecule, while, on the other hand, there are obtained alkali salts of dicarbonic acids, since the mesoxalic acid residue, which had heretofore been bound in the alloxan-nucleus, now remains bound to the benzene ring. The dicarbonic acids thus obtained have on an examination of their properties proved to be the amidophenyltartronic acids which have been hitherto unknown and which Pelizzari sought to obtain without success. If, for example, anil-alloxan $(C_{10}H_9N_3O_4)$ is submitted to the action of alkali and heat, it is decomposed into ammonia, carbon dioxid, or a carbonate and the dialkali salt of paraamidophenyltartronic acid, the reaction taking place according to the equation:

$C_{10}H_9N_3O_4+4KOH=NH_2.C_6H_4.C(OH)(COOK)_2+2NH_3+K_2CO_3$

These new products of decomposition furnish for the first time a reliable proof that the products of addition of alloxan and aromatic amids obtained by Pelizzari are to be considered as amido-phenyltartronyl-ureids. They correspond to the general structural formula

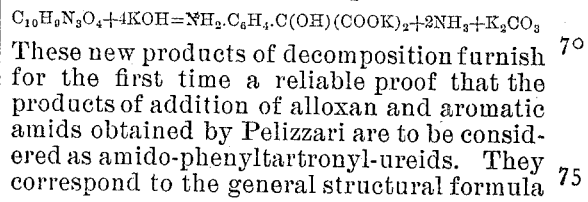

where $NH_2.X$ represents a molecule, less one atom of hydrogen, of an aromatic base not substituted in the para position to the amido group. Hence the alloxan constitutes an effective means for introducing the mesoxalic or tartronic acid residue,

which is of such great chemical activity, into the benzene molecule.

As stated above, the dialkali salts of amidophenyltartronic acid are first obtained under my process. In order to pass to the free amido-phenyltartronic acids from these alkali salts, which are as a rule readily soluble in water, they are preferably first converted into the corresponding acid salts by acidulating concentrated aqueous solution of the same. The acid alkali salts are thus either directly precipitated in crystalline form or they may be precipitated by the addition of alcohol. From the concentrated aqueous solutions of the acid alkali salts thus obtained the free amido-phenyltartronic acids are prepared by treating such solutions with the necessary and properly-computed quantities of a mineral acid. Under these conditions they are generally thrown out in the form of crystals. They are, however, redissolved and recrystallized only with difficulty, since they are apt to be decomposed with evolution of carbon dioxid and to turn yellow when heated in aqueous or alcoholic solution. These new bodies, the amido-phenyltartronic acids, have no sharply-defined melting-point. On being heated they first turn yellow and are then decomposed as the temperature is further raised, the decomposition being attended by energetic frothing. Their behavior with respect to ammoniacal silver solution is characteristic, such silver solution being reduced by them in the presence of heat, a silver mirror being formed.

Inasmuch as Pelizzari has described in detail only the three condensation products, anilalloxan, methylanilalloxan, and dimethylanilalloxan, I will before proceeding to my invention proper describe a further series of alloxan-addition products which have been first prepared by me and all of which I may utilize as starting products in the preparation of my new acids.

The homologues and substitution products of anil-alloxan (or para-amidophenyltartronylureid) are prepared by heating the component bodies in aqueous-alcoholic solution, generally in the presence of acetic acid. The resultant condensation products are separated while the solution is still warm. When they have been completely thrown out, they are separated from the mother-liquor, which is always colored red, by siphoning or decanting or the like, and then washed with water and a little alcohol. I have by this method obtained the following products of addition:

1. *Monoethylanilalloxan*, ($C_{12}H_{13}N_3O_4$.)—Tolerably soluble in hot water or alcohol. Crystallizes in short well-formed colorless prisms or spear-shaped crystals. When heated rapidly, it begins to soften at 230° centigrade, and at 243° centigrade it decomposes, the disintegration being attended by frothing.

2. *Diethylanilalloxan*, ($C_{14}H_{17}N_3O_4$.)—Sparingly soluble in hot water, but readily in boiling alcohol, out of which it crystallizes in the form of coarse shining prisms. It softens at 190° centigrade and melts and decomposes at from 210° to 212° centigrade.

3. *Benzylanil-alloxan*, ($C_{16}H_{15}N_3O_4$.)—This new compound crystallizes from hot water in the form of flat iridescent needles and from alcohol, in which it dissolves in abundant quantities, in the form of well-shaped shining crystals. At 205° to 206° centigrade it melts with considerable readiness to a pale-yellow liquid, from which bubbles of gas are slowly evolved.

4. *Methylbenzylanil-alloxan*, ($C_{17}H_{17}N_3O_4$.) This new body is difficultly soluble in hot water, but readily in hot alcohol, from which it crystallizes in the form of well-developed prisms. It begins to soften when heated to 205° centigrade, melting at 217° to 218° centigrade, with coincident liberation of gas and darkening in color.

5. *Ethylbenzylanil-alloxan*, ($C_{18}H_{19}N_3O_4$.)—Soluble with difficulty in boiling water and readily soluble in hot alcohol. From such an alcoholic solution it crystallizes in the form of flat foliated plates or prismatic crystals having a shining mother-of-pearl effect. It begins to soften at 220° centigrade and melts at 232° to 233° centigrade.

6. *Phenylanilalloxan* — (*Diphenylamido-mono-alloxan*), ($C_{16}H_{13}N_3O_4$.)—In the light this compound soon attains a reddish-brown color. It is but sparingly soluble in boiling water, but readily in hot alcohol. It crystallizes out of dilute alcohol in the form of flat prisms. It begins to soften and collapse at 220° centigrade, being decomposed at 232° centigrade, this action being attended by frothing.

7. *Diphenylamido - di - alloxan*, ($C_{20}H_{15}N_5O_8$.)—Rapidly becomes reddish brown in the light. Sparingly soluble in boiling alcohol, but readily soluble in hot water, from which it crystallizes in short prisms, which are grouped together in the form of warts. It softens at 205° centigrade, melting with decomposition at 216° centigrade.

8. *Orthotoluidin - alloxan*, ($C_{11}H_{11}N_3O_4$.)—Difficultly soluble in hot alcohol and moderately in boiling water from, which it crystallizes in the form of well-developed colorless obliquely-truncated prisms. At 220° centigrade it begins to turn a brownish color. At 240° centigrade it softens and melts with decomposition at 252° centigrade.

9. *Mono-ethyl-orthotoludinalloxan*, ($C_{13}H_{15}N_3O_4$.)—Sparingly soluble in hot water, from which it crystallizes in flat laminæ. Readily soluble in boiling alcohol, from which it crystallizes in prisms aggregated in the form of crusts. Begins to soften at 200° centigrade, melting at 205° centigrade to a yellow liquid, from which gas-bubbles are gradually evolved.

10. *Ortho-anisidin-alloxan*, ($C_{11}H_{11}N_3O_5$.)—Readily soluble in hot water or alcohol. Crystallizes in colorless prisms, which soften at 220° centigrade, and melt at 240° to 242° centigrade, with strong decomposition.

11. *Monomethyl - orthoanisidin - alloxan*, ($C_{12}H_{13}N_3O_5$.)—Readily soluble in hot water or alcohol. Crystallizes in fine needles. Begins to soften at 180° centigrade, and decomposes at 233° to 235° centigrade.

12. *Ortho-phenetidin-alloxan*, ($C_{12}H_{13}N_3O_5$.) Readily soluble in boiling alcohol or water. Crystallizes in coarse long colorless prisms. Begins to soften at 210° centigrade, and melts with decomposition at 223° to 225° centigrade.

13. *Meta-chloranil-alloxan*, ($C_{10}H_8N_3O_4Cl$.)—Moderately soluble in boiling water or alcohol. Crystallizes in small rectangular laminæ or plates. Softens slightly at 290° centigrade, and decomposes when heated over 295° centigrade.

14. *Meta-chlor-dimethylanil-alloxan*, ($C_{12}H_{12}N_3O_4Cl$.)—Tolerably soluble in hot water. Crystallizes in coarse laminæ or plates having a straw-yellow color. On rapid crystallization it takes the form of fine needles. Softens at 230° centigrade and decomposes with frothing at 248° centigrade.

15. *Meta-chloro-di-ethylanil-alloxan*, ($C_{14}H_{16}N_3O_4Cl$.)—Moderately soluble in boiling water, from which it crystallizes in short well-developed prisms of a straw color. Readily soluble in alcohol. Softens at 220° centigrade and decomposes at 250° to 251° centigrade.

16. *Ethylene-diphenyl-diamido-dialloxan*, ($C_{22}H_{18}N_6O_5$.)—Soluble with difficulty in alcohol. From a concentrated alcoholic solution of the same it is obtained in coarse shining prisms containing one molecule $C_2H_6O$. At 215° centigrade these crystals stick together and they darken and are decomposed without melting at 220° centigrade. Out of boiling water or dilute alcohol it is obtained in fine acicular crystals, which soften at 190° centigrade and are decomposed at about 215° centigrade.

In order to fully disclose my invention, I will now recite a number of examples which represent what I consider the preferred method of carrying out the same.

I. *Preparation of para-amidophenyltartronic acid* ($NH_2.C_6H_4.C_3H_3O_5$) *from anilin-alloxan.*—Twelve parts, by weight, of anilin-alloxan are gradually introduced while stirring into twenty-six parts, by volume, of potash lye, ($KHO+A_9$,) which has ten times the strength of normal potash lye and which has been previously heated on a boiling-water bath. The anilin-alloxan is rapidly dissolved, while at the same time an energetic evolution of ammonia takes place. As soon as all of the anilin-alloxan has gone into solution the whole is subjected to evaporation while being stirred. Under this treatment the solution gradually thickens to a stiff crystalline semiliquid mass or paste, comprising an aggregation of fine needles, which needles consist of the di-potassium salt of para-amidophenyl-tartronic acid. This crystalline mass is then dissolved in warm water and the resultant solution evaporated for driving off the ammonia as completely as possible. The residue is thoroughly dried and is then dissolved in about thirty-six parts, by weight, of water under the influence of heat, and the resultant alkaline solution is then acidulated with a suitable acid—such as acetic acid, for example. Under this treatment the acid potassium salt of amidophenyltartronic acid is thrown out in the form of fine needles. This precipitate is then separated from the mother-liquor by siphoning, decanting, or in any other suitable manner after cooling. The remainder of the salt may be obtained from the mother-liquor by adding alcohol.

In order to obtain the free acid, ten parts, by weight, of the acid potassium salt are dissolved in about two hundred parts, by weight, of warm water, 3.8 parts of potash lye ($KHO+Aq$) of ten times the normal strength being added. The resultant solution is treated with animal charcoal or other decolorizing agent and filtered, and the clear colorless filtrate is then treated with thirteen parts, by volume, of a solution of hydrochloric acid having six times the strength of the normal acid. Thereupon the para-amidophenyltartronic acid is thrown out in the form of shining colorless needles, such precipitation generally taking place already before the solution has cooled off. This crystalline mass after standing for a considerable time in the cold changes into a crystalline mass consisting of coarse generally square plates or tablets. After this mass has stood for some time in the cold the crystals are drained by siphoning or otherwise removing the mother-liquor and washed with some cold water. This acid is soluble in hot water with tolerable ease, more difficultly in alcohol. It cannot, however, be recrystallized from these solutions, since on heating the same carbonic acid is very soon evolved, the solutions becoming intensely yellow. Its formula is $NH_2.C_6H_4.C_3H_3O_5$, or

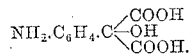

The normal alkali salts, (including ammonium salt,) which are readily soluble in water, may be converted into the acid salts, which are only difficultly soluble in cold water, by reacting thereon with acetic acid.

Amidophenyl-tartronic acid is readily soluble without decomposition in dilute mineral acids and also in concentrated hydrochloric and sulfuric acids. On heating these solutions carbon dioxid is very soon liberated. This acid has no sharply-defined melting-point. On heating the same it begins to turn yellow at 150° centigrade, and from that point it becomes progressively darker with the elevation of temperature until decomposition takes place at from 215° to 220° centigrade, the decomposition being accompanied by frothing. An ammoniacal solution of the acid reduces a silver solution in the heat with formation of a shining silver mirror.

II. *Preparation of para-amido-meta-toluyltartronic acid from ortho-toluidin-alloxan.*—Twenty-five parts, by weight, of ortho-toluidin-alloxan are gradually introduced into fifty-two parts, by volume, of ten times normal potash lye, ($KHO+Aq$,) which has been previously heated on a boiling-water bath, the introduction being accompanied by stirring. After the solution has been effected the same is evaporated to completely drive off the ammonia. The residual crystalline mass is then dissolved in water, and this solution is also evaporated. The residue, which should be as dry as possible, is brought into solution with a small amount of water (three parts, by volume) and application of heat, (40° centigrade.) The clear brownish-yellow solution thus obtained is then slightly acidulated with any suitable acid—such, for example, as acetic acid. Upon adding to this solution from three to four parts, by volume, of alcohol the acid potassium salt of para-amido-meta-toluyltartronic acid is thrown out, and after the same has stood for some time (eight to ten hours) in the cold the mother-liquor is drained from the precipitate in any suitable manner—such, for example, as siphoning or decanting.

To obtain the free acid, the mono-potassium salt is dissolved in two parts, by weight, of water at a gentle heat, and hydrochloric acid is then added until the same colors Congo paper. From the solution thus prepared the new compound, paraämido-metatoluyltartronic acid, begins to precipitate while still warm in the form of needles grouped in star-shaped aggregations, which are only slightly colored. The crystallization is completed after the solution has stood for some time in the cold. This new acid, whose formula is $NH_2.C_7H_6.C_3H_3O_5$, or

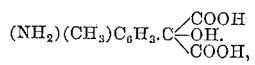

is readily soluble in mineral acids and dilute alkalies, including ammonia. An ammoniacal solution of the same will reduce an ammoniacal silver solution when heated, a silver mirror being formed. It begins to turn yellow when heated to over 150° centigrade. On raising the temperature above this point the compound gradually and progressively becomes darker until it is dark brown. At 194° to 195° centigrade it is decomposed, the decomposition being accompanied by foaming or frothing.

III. *Preparation of para-ethylene-di-amidophenyltartronic acid from ethylene-diphenyl-diamido-dialloxan.*—Five parts, by weight, of ethylene-diphenyl-diamido-dialloxan are dissolved warm in 10.5 parts, by volume, (corresponding to ten and one-half molecules,) of a solution of hydrate of potassium having ten times the strength of normal potash lye. The solution is evaporated until crystallization takes place. The crystals are then dissolved in water, and the solution is again evaporated. The crystalline residue is then taken up with a minimum quantity of warm water (40° centigrade) and then acidulated with a suitable acid—such as, preferably, glacial acetic acid—and finally treated with alcohol. As a result of this treatment a concentrated aqueous solution of the acid potassium salt is first separated, which solution subsequently, after standing for some time, will be found to be in the form of a thick syrup covered by a layer of alcoholic lye. This supernatant lye may be poured off from the said syrup. The acid potassium salt of the new compound thus freed from the lye is then triturated with alcohol, whereby it is caused to assume a crystalline structure. The crystallized mono-potassium salt thus obtained is then dissolved warm in a little water, (about three parts, by weight.) The resultant red solution is then treated with a decolorizing agent, such as animal charcoal, and filtered, and the filtrate is slightly acidulated with a suitable acid—such as hydrochloric acid, for example. The new compound, paraethylene-diamido-diphenyltartronic acid, is thus obtained in the form of a slightly-colored fine crystalline precipitate, which will form in spheroidal aggregates when crystallization takes place slowly. This new acid is readily soluble in alkalies and mineral acids. An ammoniacal solution of the same reduces an ammoniacal silver solution in the presence of heat, with formation of a silver mirror. On heating the said new acid above 300° centigrade it gradually becomes dark brown, and it is decomposed without melting at a temperature above 400° centigrade. The formula of the new acid is $C_2H_4.N_2H_2:(C_6H_4.C_3H_3O_5)_2$, or

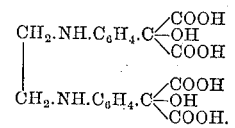

In addition to the above the following compounds belonging to this class have been prepared by me by proceding according to the method above described and substituting the corresponding condensation products, as indicated below.

IV. *Paramethyl-amidophenyltartronic acid from methylanil-alloxan.*—This new acid, whose formula is $CH_3.HN.C_6H_4.C_3H_3O_5$, crystallizes in fine concentric or radially-grouped needles, which when allowed to remain in the mother-liquor or solution change to coarse flat prisms. When heated beyond 120° centigrade and about 180° centigrade, the mass, which has become orange-colored, decomposes, this change being accompanied by frothing.

V. *Preparation of paradimethyl-amidophenyltartronic acid from dimethylanil-alloxan.* (Formula: $(CH_3)_2N.C_6H_4.C_3H_3O_5$.)—Crystallizes in coarse flat prisms pointed in one direction. Decomposes at 109° to 110° centigrade, the decomposition being preceded by slight coloration and attended by frothing or effervescence.

VI. *Para-ethylamido-phenyltartronic acid from mono-ethylanil-alloxan.*—This new acid softens at 125° centigrade and decomposes at about 163° centigrade. Its formula is $C_2H_5.NH.C_6H_4.C_3H_3O_5$.

VII. *Paradiethylamido-phenyltartronic acid from diethylanil-alloxan.*—Crystallizes in fine needles which are decomposed with attendant frothing at 107° to 108° centigrade. Formula: $(C_2H_5)_2N.C_6H_4.C_3H_3O_5$.

VIII. *Paramido-metamethoxyphenyltartronic acid from ortho-anisidin-alloxan.*—Crystallizes in short coarse prisms, which turn yellow at 150° centigrade and which are decomposed at 187° to 188° centigrade, the decomposition being accompanied with darkening and frothing. Formula:

$$NH_2.(CH_3O)C_6H_3.C_3H_3O_5.$$

IX. *Paramethylamido-meta-methoxyphenyltartronic acid from methylorthoanisidin-alloxan.*—Crystallizes in fine needles, which become yellow at 120° centigrade and which are decomposed gradually at 135° centigrade, with attendant frothing or effervescence. Formula: $CH_3.NH(CH_3O)C_6H_3.C_3H_3O_5.$ X. *Paramido-meta-ethoxyphenyltartronic acid from ortho-phenetidin-alloxan.*—Crystallizes in flat coarse needles, turns yellow at 140° centigrade, and decomposes at about 175° centigrade, with attendant frothing and darkening of color. Formula:

$$NH_2.(C_2H_5O):C_6H_3.C_3H_3O_5.$$

XI. *Paramido-ortho-chlorophenyltartronic acid from meta-chloranil-alloxan.*—Crystallizes in fine needles, which turn yellow at about 145° centigrade and which melt with decomposition at 198° to 199° centigrade. Formula: $NH_2.C_5H_3.Cl.C_3H_3O_5.$ XII. *Parabenzylamido-phenyltartronic acid from benzylanil-alloxan.*—Is precipitated in the form of an indistinctly-crystallized straw-colored powder, which melts at about 137° centigrade, with attendant frothing. Formula: $C_7H_7.NH.C_6H_4.C_3H_3O_5.$ XIII. *Paraphenylamido-phenyltartronic acid from diphenylamido-alloxan.*—Crystallizes in shining mother-of-pearl-colored scales or in fine needles, which melt at from 125° to 127° centigrade with decomposition. Formula: $C_6H_5.NH.C_6H_4.C_3H_3O_5.$ XIV. *Paraethylamido-metatoluyltartronic acid from ethyl-orthotoluidin-alloxan.*—Formula: $C_2H_5.NH.C_7H_6.C_3H_3O_5.$ The following acids of this series have not hitherto been isolated in crystalline form, but have been obtained in the form of their acid potassium salts:

XV. *Para-ethylbenzylamido-phenyltartronic acid from ethylbenzylanil-alloxan.*—Formula: $C_2H_5.C_7H_7.N.C_6H_4.C_3H_3O_5.$ XVI. *Paradimethylamido-ortho-chlorophenyl-tartronic acid from meta-chlorodimethylanil-alloxan.*—Formula:

$$(CH_3)_2N.C_6H_3.Cl.C_3H_3O_5.$$

XVII. *Paradiethylamido-orthochlorophenyltartronic acid from meta-chlorodiethylanil-alloxan.*—Formula:

$$(C_2H_5)_2N.C_6H_3.Cl.C_3H_3O_5.$$

XVIII. *Para-imidodiphenyl-tartronic acid from diphenylamido-di-alloxan.*—Formula:

$$NH:(C_6H_4.C_3H_3O_5)_2.$$

As will be seen from the above, my invention, broadly considered, consists in splitting off the urea residue from a condensation product of alloxan with an aromatic base, which may be done by submitting the same to the action of an alkali and heat, and, further, in the subsequent solution of the resultant normal alkali salt of the new acids in water, followed by evaporation and acidulation to form the acid alkali salt, and, finally, in dissolving the latter product and treating with a mineral acid, such as hydrochloric or equivalent acid, to form the free acid.

It should be noted that instead of the acetic acid set forth above in the preparation of the acid alkali salts of my new acids other equivalent acids may be employed and also that the hydrochloric acid set forth in the final step of the preparation of my new acids may be replaced by other mineral acids.

From the above description and considerations it follows, moreover, that the new acids, (the amido-phenyltartronic acids) correspond to the general structural formula:

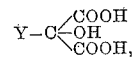

where Y represents a molecule of an aromatic base less one atom of hydrogen. For paramidophenyltartronic acid prepared from anilin-alloxan—*e. g.*, Y corresponds to the group $NH_2.C_6H_4$ or

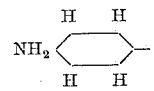

the formula of this amido-phenyltartronic acid being

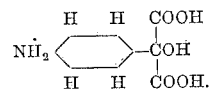

These acids, it will be noted from the formula, are all bibasic acids. A large number of them have the property of turning yellow at a raised temperature, and on further raising the temperature they turn darker in most cases. All of them, so far as investigated, decompose at higher temperatures, and therefore have no melting-point. This decomposition is generally attended by frothing or effervescence, due to the evolution of gas. The reaction whereby they are generated from the addition products of alloxan and an aromatic base is indicated by the equation for amidophenyl-tartronic acid.

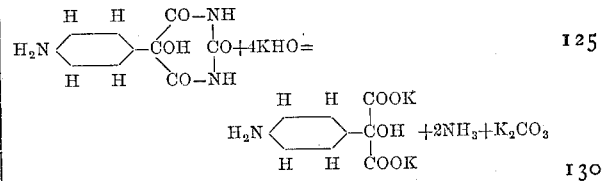

and, generally, for the preparation of all the amido-phenyl-tartronic acids by the equation:

$$Y \cdot C_4H_3O_4N_2 + 4KHO =$$
$$Y \cdot C_3HO_5K_2 + 2NH_3 + K_2CO_3,$$

or structurally:

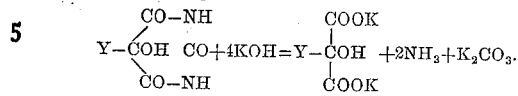

What I claim, and desire to secure by Letters Patent of the United States, is—

1. The process which consists in heating a condensation product of alloxan and an aromatic base with an alkali.

2. The process which consists in dissolving a normal alkali salt of an amido-phenyltartronic acid in water and acidulating the solution, whereby the acid alkali salt of such acid is thrown out.

3. The process which consists in dissolving a normal alkali salt of amido-phenyltartronic acid in water acidulating the solution and adding alcohol thereto for throwing out the corresponding acid alkali salt.

4. The process which consists in dissolving an acid alkali salt of an amido-phenyltartronic acid and acidulating the solution with a mineral acid.

5. The process which consists in dissolving an acid alkali salt of an amido-phenyltartronic acid in water and acidulating the solution with hydrochloric acid.

6. The process which consists in dissolving an acid alkali salt of an amido-phenyltartronic acid and adding thereto a decolorizing agent, then filtering and finally adding a mineral acid to the filtrate whereby the free amido-phenyltartronic acid is precipitated.

7. The process which consists in treating a condensation product of alloxan and an aromatic base with an alkali, then dissolving the resultant normal alkali salt of amido-phenyltartronic acid in water and acidulating the solution and finally dissolving the resultant acid alkali salt and treating the solution with a mineral acid to throw out the free amido-phenyltartronic acid.

8. The process which consists in heating a condensation product of an alloxan and an aromatic base with an alkali, then dissolving the resultant product in water and acidulating the solution and adding alcohol and then dissolving the resultant acid alkali salt of amido-phenyltartronic acid in alkali and water and adding to the solution a decolorizing agent and filtering and adding a mineral acid to the filtrate.

9. As a new chemical compound, amido-tartronic acid of the aromatic series having the structural formula

as hereinbefore set forth, the same being a bibasic acid which has no defined melting-point but decomposes when heated to temperatures where it leaves the solid state, and which reduces silver solutions with the formation of a silver mirror.

10. As a new chemical compound, an amido-tartronic acid of the aromatic series having the formula above given, the same being a bibasic acid which turns yellow at a raised temperature and assumes a dark color on still further raising the temperature, which has no defined melting-point but decomposes with effervescence when heated to temperatures at which it leaves the solid state and which reduces silver solutions with the formation of a silver mirror.

In testimony whereof I have signed my name to this specification in the presence of two subscribing witnesses.

FRITZ ACH.

Witnesses:
 MAX BURBNER,
 JACOB ADRIAN.